(12) United States Patent
Tanaka et al.

(10) Patent No.: US 7,133,192 B2
(45) Date of Patent: Nov. 7, 2006

(54) LIGHT AMPLIFICATION CONTROL UNIT AND METHOD

(75) Inventors: Tomoto Tanaka, Yokohama (JP); Yuji Tamura, Yokohama (JP)

(73) Assignee: Fujitsu Limited, Kawasaki (JP)

( * ) Notice: Subject to any disclaimer, the term of this patent is extended or adjusted under 35 U.S.C. 154(b) by 92 days.

(21) Appl. No.: 10/792,746

(22) Filed: Mar. 5, 2004

(65) Prior Publication Data

US 2004/0190122 A1 Sep. 30, 2004

(30) Foreign Application Priority Data

Mar. 31, 2003 (JP) .............................. 2003-093279

(51) Int. Cl.
*H01S 3/00* (2006.01)

(52) U.S. Cl. ..................................... 359/334
(58) Field of Classification Search ........... 359/341.33, 359/334

See application file for complete search history.

(56) References Cited

U.S. PATENT DOCUMENTS

| | | | |
|---|---|---|---|
| 6,424,455 B1 * | 7/2002 | Dmitri ......................... | 359/334 |
| 6,700,696 B1 * | 3/2004 | Dominic et al. ....... | 359/341.32 |
| 6,721,088 B1 * | 4/2004 | Brar et al. ................... | 359/334 |
| 6,813,067 B1 * | 11/2004 | Birk et al. ................... | 359/334 |
| 6,833,947 B1 * | 12/2004 | Cussat-Blanc et al. ...... | 359/334 |
| 6,867,906 B1 * | 3/2005 | Eder et al. ................... | 359/334 |
| 2002/0097481 A1 * | 7/2002 | Du et al. ..................... | 359/334 |
| 2002/0105716 A1 * | 8/2002 | Tanaka et al. ............... | 359/334 |
| 2002/0145793 A1 * | 10/2002 | Bock et al. ................. | 359/334 |
| 2003/0210457 A1 * | 11/2003 | Emori et al. ................. | 359/334 |

OTHER PUBLICATIONS

Patent Abstracts of Japan Publication No. 11-145533.
Patent Abstracts of Japan Publication No. 11-74595.

* cited by examiner

*Primary Examiner*—Deandra M. Hughes
(74) *Attorney, Agent, or Firm*—Staas & Halsey LLP

(57) ABSTRACT

A light amplification control unit whereby the gain of an optical amplifier can be controlled with ease. A plurality of pump light sources each generate a pump beam having the effect of amplifying a signal beam, and an external control light source generates an external control beam having a wavelength that influences the signal beam amplification effect by means of the pump beams. A multiplexing section multiplexes the pump beams with the external control beam and causes the multiplexed beams to enter an optical fiber in a direction opposite to that of the signal beam. A control section controls the output of the external control beam from the external control light source, whereby the gain of the signal beam amplified by the pump light sources can be controlled.

8 Claims, 19 Drawing Sheets

PUMP RATIO ADJUSTMENT CONTROL

| GAIN VARIATION [dB] | TILT CHANGE [dB] |
|---|---|
| 0 | 0 |
| −1.14 | 0.15 |
| −2.33 | 0.26 |
| −3.55 | 0.36 |
| −6.07 | 0.61 |
| −8.64 | 0.87 |
| −11.22 | 1.15 |
| −13.79 | 1.40 |
| −16.34 | 1.63 |
| −18.86 | 1.82 |

FIG. 13

CONSTANT PUMP CONTROL

| GAIN VARIATION [dB] | TILT CHANGE [dB] |
|---|---|
| 0 | 0 |
| −1.11 | 0.33 |
| −2.27 | 0.65 |
| −3.47 | 0.97 |
| −5.95 | 1.56 |
| −8.50 | 2.06 |
| −11.07 | 2.44 |
| −13.66 | 2.68 |
| −16.24 | 2.76 |
| −18.80 | 2.65 |

FIG. 14

OUTPUT CONTROL OF EXTERNAL CONTROL LIGHT

| GAIN VARIATION [dB] | TILT CHANGE [dB] |
|---|---|
| 0 | 0 |
| −0.01 | 0.00 |
| −0.14 | 0.02 |
| −1.27 | 0.14 |
| −2.31 | 0.26 |
| −3.91 | 0.44 |
| −6.08 | 0.72 |
| −8.73 | 1.14 |
| −11.75 | 1.80 |

FIG. 15

LIGHT AMPLIFICATION CONTROL UNIT AND METHOD

BACKGROUND OF THE INVENTION (1) Field of the Invention

The present invention relates to a unit and method for controlling light amplification, and more particularly, to an optical amplifier utilizing the Raman effect and light amplification control unit and method using such an optical amplifier.

(2) Description of the Related Art

Optical amplifiers used in wavelength division multiplexing optical transmission systems include optical amplifiers doped with a rare-earth element (such as erbium-doped optical amplifiers) and Raman amplifiers utilizing the stimulated Raman scattering effect. In the erbium-doped optical amplifier, for example, an erbium-doped fiber amplifier comprising an erbium-doped optical fiber and a pump light source is connected with an external control light generator, and the inverted component within the erbium-doped optical fiber is controlled by the external control light (cf. Japanese Unexamined Patent Publication No. H11-145533 (FIG. 1)).

Meanwhile, if an optical transmission system including optical amplifiers connected in multiple stages is associated with a gain-wavelength characteristic, a low-gain channel is deteriorated in optical signal-to-noise ratio (optical SNR) while in a high-gain channel the waveform is distorted due to nonlinear optical effect etc. It is therefore necessary that the gain-wavelength characteristic should be flattened.

The Raman amplifier uses a plurality of pump light sources for generating beams of different wavelengths and the individual amounts of pump beams are adjusted so that the in-band gain-wavelength characteristic may be constant. For example, there has been known a Raman amplifier which uses pump light obtained by multiplexing beams of 12 different wavelengths, in order to flatten the gain (cf. Y. Emori, et al., "100 nm bandwidth flat gain Raman amplifiers pumped and gain-equalized by 12-wavelength-channel WDM high power laser diodes", OFC'99, PD19 (1999)).

FIG. 17 shows an exemplary configuration of a conventional Raman amplifier. Light $\lambda_S$ incident on an optical fiber 201 is emitted via a WDM (Wavelength Division Multiplexing) coupler 202 and an optical coupler 203. The optical coupler 203 guides part of the incident light $\lambda_S$ to a light receiving element 204. The light receiving element 204 receives the light and supplies a control section 205 with an electrical signal corresponding to the intensity of the light. The control section 205 measures the intensity of the incident light $\lambda_S$ on the basis of the electrical signal supplied thereto, and computes the intensity of pump light to be input to the optical fiber 201. Then, the control section 205 outputs a control signal indicative of the computation result to a pump light source 206.

The pump light source 206 generates a plurality of pump beams $\lambda_{P1}$ to $\lambda_{PN}$ with intensity corresponding to the control signal from the control section 205. The pump beams $\lambda_{P1}$ to $\lambda_{PN}$ generated by the pump light source 206 are introduced into the optical fiber 201 by the WDM coupler 202, whereupon Raman scattering takes place within the optical fiber 201, thus amplifying the incident light $\lambda_S$.

FIG. 18 is a block diagram illustrating a conventional output control method for pump light sources. A signal beam transmitted through a transmission path 210 reaches an optical coupler 212 via a WDM coupler 211. In the optical coupler 212, part of the signal beam is extracted and transmitted to a channel monitor 213. The channel monitor 213 detects the wavelength and output of each channel and supplies, in the form of an electrical signal, information about the wavelength and output of each channel to a control section 214.

The control section 214 determines the output power for each of pump light sources 221, 222, 223. Control information indicative of the determined output power is then supplied from the control section 214 to a corresponding one of the pump light sources 221, 222, 223. Each of the pump light sources 221, 222, 223 outputs a pump beam with power corresponding to the control information supplied from the control section 214.

The pump beams are multiplexed by a multiplexer 231 and transmitted to the WDM coupler 211. The WDM coupler 211 causes the multiplexed pump light from the multiplexer 231 to enter the transmission path 210 in a direction opposite to that of the signal beam.

FIG. 19 illustrates the wavelength-optical output relationship according to the conventional technique, wherein the horizontal axis indicates wavelength and the vertical axis indicates optical output (gain).

As seen from FIG. 19, where the outputs of the individual pump light sources 221, 222, 223 change, the gains of single-pump gain spectra 241, 242, 243 are synthesized, forming a multiple-pump Raman gain spectrum 244.

However, the Raman amplifier needs to be controlled with the gain-wavelength characteristic of light amplification maintained, in order to compensate for level variations of transmitters and loss variations of the fiber transmission path. Also, in the case of a high-gain Raman amplifier operating with high-output pump light sources, if the number of wavelengths changes due to bandwidth upgrade or as a result of increase or decrease in the number of wavelengths by an OADM (optical multiplexer/demultiplexer) node which adds/drops transmit signals, the gain may undergo variation, possibly influencing the signal beam.

In the conventional optical output control wherein the amounts of individual pump beams are adjusted, the pump light sources used for flattening the gain need to be individually controlled taking account of the pump ratio of the light sources, which makes it difficult to control the optical output with ease at high speed. Where the outputs of the pump light sources 221, 222, 223 shown in FIG. 18 change, for example, the single-pump gain spectra 241, 242, 243 overlap each other (cf. FIG. 19). It is therefore necessary that the output information of each channel be monitored to clarify the interrelationship of the individual bands (channels) to be applied, or the power of each pump light source needs to be controlled stepwise. Consequently, it is difficult to have the control section 214 compute suitable power for the individual pump light sources. If the computation is simplified so as to control the pump ratio uniformly, then gain tilt arises.

SUMMARY OF THE INVENTION

The present invention was created in view of the above circumstances, and an object thereof is to provide light amplification control unit and method whereby the gain of an optical amplifier can be controlled with ease.

To achieve the object, there is provided a light amplification control unit for controlling amplification of a signal beam propagated through an optical fiber. The light amplification control unit comprises a plurality of pump light sources each for generating a pump beam having an effect of amplifying the signal beam, an external control light source for generating an external control beam having a wavelength that influences the signal beam amplification effect by means of the pump beams, a multiplexing section for multiplexing the pump beams with the external control beam and causing the multiplexed beams to enter the optical fiber in a direction opposite to that of the signal beam, and a control section for controlling the output of the external control beam from the external control light source.

Also, to achieve the above object, there is provided a light amplification control method for controlling amplification of a signal beam propagated through an optical fiber. The light amplification control method comprises the step of generating a plurality of pump beams each having an effect of amplifying the signal beam, the step of generating an external control beam having a wavelength that influences the signal beam amplification effect by means of the pump beams, and the step of multiplexing the pump beams with the external control beam and causing the multiplexed beams to enter the optical fiber in a direction opposite to that of the signal beam.

The above and other objects, features and advantages of the present invention will become apparent from the following description when taken in conjunction with the accompanying drawings which illustrate preferred embodiments of the present invention by way of example.

BRIEF DESCRIPTION OF THE DRAWINGS

FIG. 13 is a diagram showing tilt changes observed when pump ratio adjustment control is performed.

FIG. 14 is a diagram showing tilt changes observed when constant pump control is performed.

FIG. 15 is a diagram showing tilt changes observed when output control of the external control light is performed.

DESCRIPTION OF THE PREFERRED EMBODIMENTS

Embodiments of the present invention will be hereinafter described with reference to the drawings.

Figure 1:
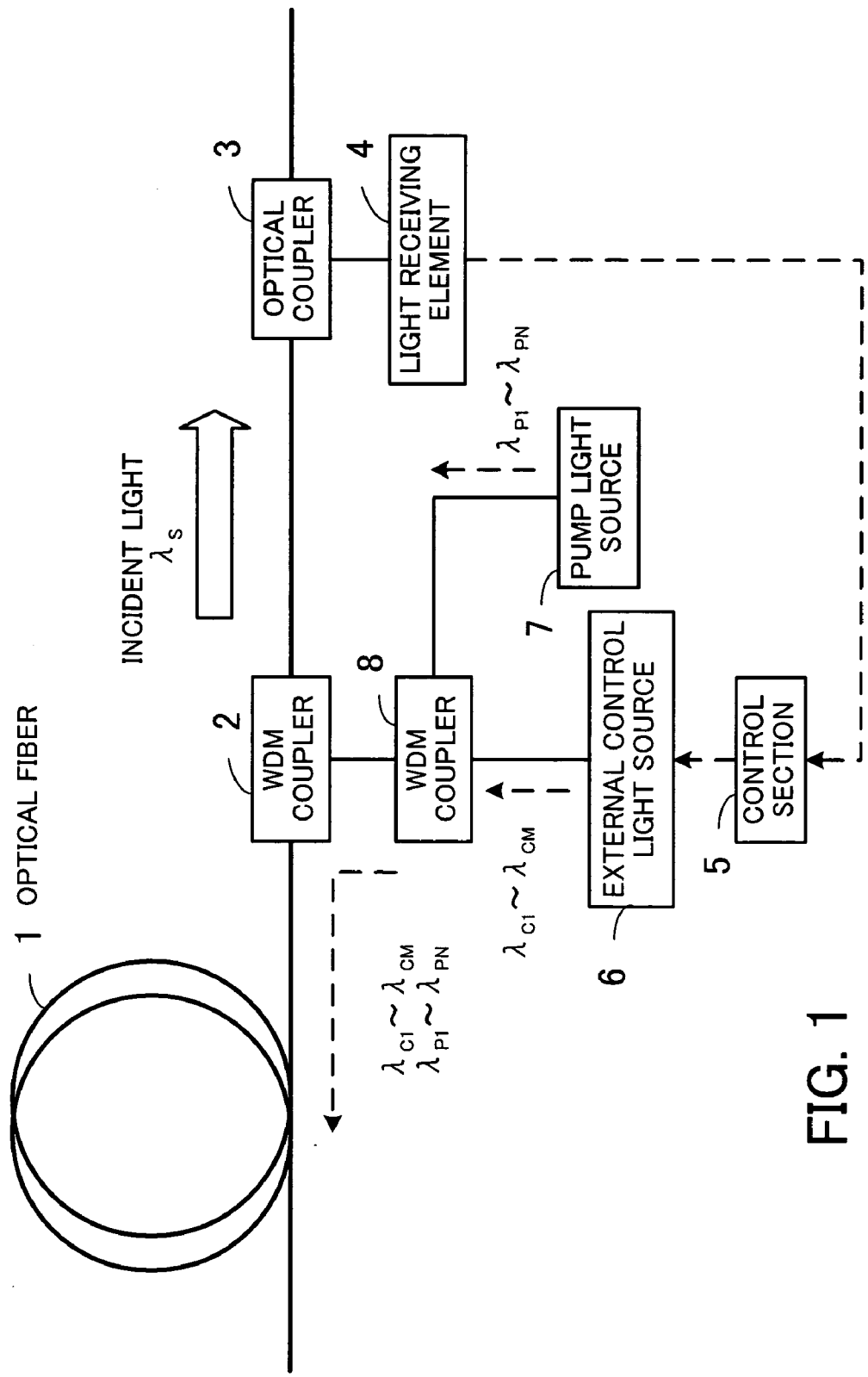
FIG. 1 is a diagram showing a light amplification control unit according to an embodiment of the present invention.

FIG. 1 shows a light amplification control unit according to an embodiment of the present invention. The output of an optical amplifier of the present invention can be controlled with ease at high speed by adjusting the output of external control light emitted in the same direction as pump light.

In the light amplification control unit of the present invention, an optical fiber 1 is connected to a WDM coupler 2, as shown in FIG. 1. The WDM coupler 2 is connected to an optical coupler 3, which is connected, in addition to an emission path for incident light $\lambda_S$ (signal wavelengths $\lambda_{S1}$ to $\lambda_{SN}$), to a light receiving element 4.

The light receiving element 4 generates an electrical signal corresponding to the intensity of the incident light and comprises, for example, a photodiode. The light receiving element 4 is connected to a control section 5 by an electrical signal line. The control section 5 is a circuit for computing intensity of external control light on the basis of the light intensity detected by the light receiving element 4. The control section 5 is connected to an external control light source 6 by a signal line for transmitting a control signal.

The external control light source 6 includes a plurality of light sources for generating external control light beams $\lambda_C$ (external control beam wavelengths $\lambda_{C1}$ to $\lambda_{CM}$) in accordance with the control signal from the control section 5. The external control light $\lambda_{C1}$ contains multiple wavelengths that influence the effect of amplifying the signal beam by means of pump light $\lambda_P$ (pump beam wavelengths $\lambda_{P1}$ to $\lambda_{PN}$). The wavelengths of the external control light $\lambda_C$ are set close to the signal band of the incident light $\lambda_S$ and do not directly contribute to the amplification of the incident light $\lambda_S$.

The external control light source 6 is connected to a WDM coupler 8 through a transmission path for propagating the external control light $\lambda_C$.

Also, a pump light source 7 for generating the pump light $\lambda_P$ is connected to the WDM coupler 8 through a transmission path for propagating the pump light $\lambda_P$. The pump light source 7 includes a plurality of light sources for generating the pump light beams $\lambda_P$. The pump light $\lambda_P$ contains multiple wavelengths that induce Raman amplification of the incident light $\lambda_S$ propagated through the optical fiber 1.

The WDM coupler 8 is connected to the WDM coupler 2. The WDM couplers 8 and 2 constitute a multiplexer for introducing the external control light $\lambda_C$ and the pump light $\lambda_P$ into the optical fiber 1.

For the external control light source 6 and the pump light source 7, a fiber Raman laser, a DFB (Distributed Feed-Back)-LD (Laser Diode), a DBR (Distributed Bragg Reflection)-LD, an FP (Fabry-Perot)-LD or the like may be used. The Raman gain has a Raman gain frequency shift [13.2 THz≈100 nm] with respect to the signal band. Thus, the external control light $\lambda_C$, of which the wavelengths are set in the vicinity of the signal band, do not directly influence the gain of the incident light $\lambda_S$, as distinct from the pump light.

In the light amplification control unit configured as described above, the pump light $\lambda_P$ (pump beam wavelengths $\lambda_{P1}$ to $\lambda_{PN}$) for amplifying the incident light $\lambda_S$ is controlled in the manner explained below.

The incident light $\lambda_S$ from the optical fiber 1 is emitted via the WDM coupler 2 and the optical coupler 3. The optical coupler 3 diverts part of the incident light $\lambda_S$ to the light receiving element 4. The light receiving element 4 receives the diverted light and supplies the control section 5 with an electrical signal corresponding to the intensity of the received light. The control section 5 measures the intensity of the incident light $\lambda_S$ on the basis of the electrical signal supplied thereto, and computes the intensity of pump light to be input to the optical fiber 1. Then, the control section 5 outputs a control signal indicative of the computation result to the external control light source 6.

The external control light source 6 generates external control light $\lambda_C$ corresponding to the control signal from the control section 5. The external control light $\lambda_C$ generated by the external control light source 6 is input to the WDM coupler 8.

The WDM coupler 8 is also input with the pump light $\lambda_P$ output from the pump light source 7. The external control light $\lambda_C$ and the pump light $\lambda_P$ are emitted via the WDM coupler 8 to the WDM coupler 2, and are guided into the optical fiber 1 by the WDM coupler 2.

Thus, during propagation through the optical fiber 1, the incident light $\lambda_S$ is amplified as a result of Raman scattering that takes place within the optical fiber 1 due to the pump light $\lambda_P$. At this time, the amount of amplification gain varies depending on the intensity of the external control light $\lambda_C$. Namely, the Raman scattering effect induced by the pump light $\lambda_P$ exerts an influence on the external control light $\lambda_C$, so that the gain of the incident light $\lambda_S$ decreases.

Figure 2:
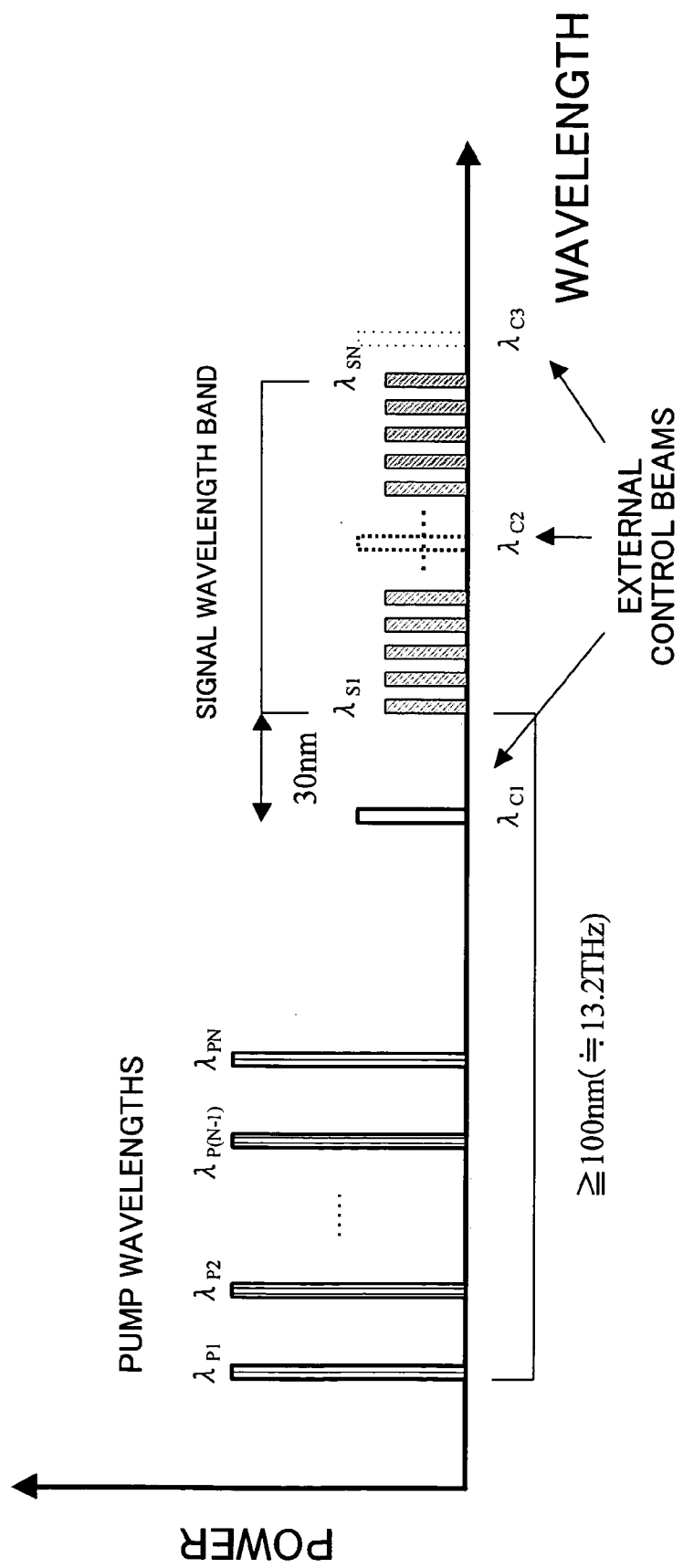
FIG. 2 is a diagram illustrating the relationship of signal wavelengths, pump wavelengths, and external control beam wavelengths.

FIG. 2 illustrates the relationship of signal wavelengths, pump wavelengths, and external control beam wavelengths, wherein the horizontal axis indicates wavelength and the vertical axis indicates power. The pump wavelengths $\lambda_{P1}$ to $\lambda_{PN}$ are set to fall within a band shifted by about 100 nm (shifted by about 13.2 THz in terms of frequency) from the band containing the signal wavelengths $\lambda_{S1}$ to $\lambda_{SN}$ of the incident light $\lambda_S$.

The external control beam wavelengths are set to fall within a range wider than the band of the signal wavelengths $\lambda_{S1}$ to $\lambda_{SN}$ by +30 nm and −30 nm. In the example shown in FIG. 2, an external control wavelength $\lambda_{C1}$ is set at a wavelength shifted on the shorter wavelength side by about 30 nm from the band of the signal wavelengths $\lambda_{S1}$ to $\lambda_{SN}$, an external control wavelength $\lambda_{C2}$ is set at the center of the band of the signal wavelengths $\lambda_{S1}$ to $\lambda_{SN}$, and an external control wavelength $\lambda_{C3}$ is set at a wavelength shifted on the longer wavelength side by about 30 nm from the band of the signal wavelengths $\lambda_{S1}$ to $\lambda_{SN}$.

With the signal wavelengths, pump wavelengths and external control beam wavelengths distributed as shown in FIG. 2, the power of the external control light is controlled, whereby the power of the pump light can be controlled. In this case, the pump wavelengths $\lambda_{P1}$ to $\lambda_{PN}$ as a whole can be adjusted by controlling the beams of three wavelengths as the external control light, so that the pump light can be adjusted with ease, compared with the case of controlling the power of the individual pump wavelengths $\lambda_{P1}$ to $\lambda_{PN}$.

An optical transmission system using the light amplification control unit configured as above will be now described. The light amplification action attributable to Raman amplification takes place within an optical fiber, and therefore, strictly speaking, the light amplification control unit and an optical fiber constitute one Raman amplifier. In the following description, however, the light amplification control unit is also regarded as an optical amplifier (Raman amplifier).

Figure 3:
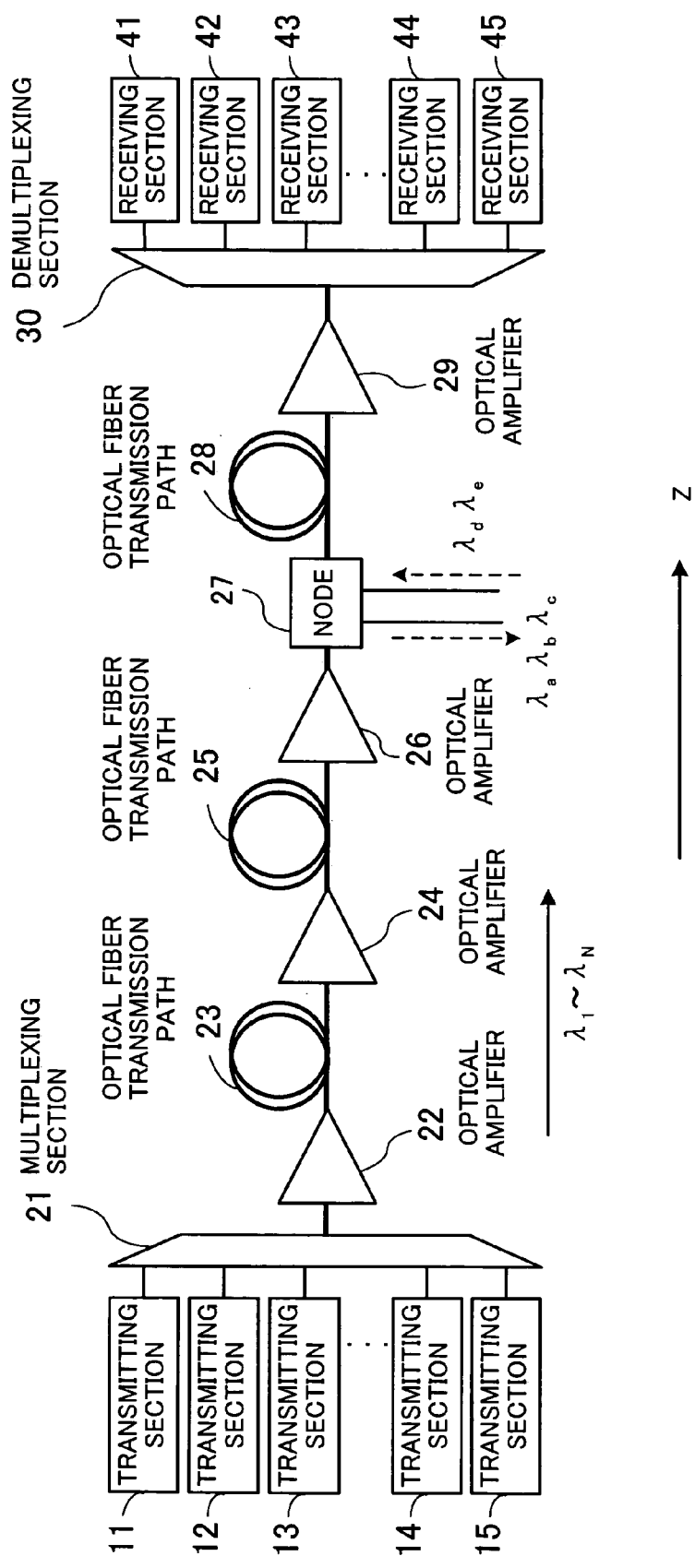
FIG. 3 is a diagram showing a schematic configuration of an optical fiber transmission system using Raman amplifiers.

FIG. 3 shows a schematic configuration of an optical fiber transmission system using Raman amplifiers, wherein the left-to-right direction is indicated at Z.

In the optical fiber transmission system, optical signals output from transmitting sections 11 to 15 are input to a multiplexing section 21 where the optical signals are multiplexed. On the signal output side of the multiplexing section 21 is connected an optical amplifier 22. The optical amplifier 22 is connected through an optical fiber transmission path 23 to an optical amplifier 24, which is connected through an optical fiber transmission path 25 to an optical amplifier 26.

The optical amplifier 26 is connected to a node 27 which adds or drops optical channels. The node 27 is connected through an optical fiber transmission path 28 to an optical amplifier 29, which in turn is connected to a demultiplexing section 30. The demultiplexing section 30, which demultiplexes the optical signals input thereto, is connected to a plurality of receiving sections 41 to 45 associated with the demultiplexed optical signals.

Each of the optical amplifiers 22, 24, 26 and 29 may be constituted by a Raman amplifier alone to which the present invention is applied or may additionally include a rare earth-doped amplifier, such as an erbium-doped optical amplifier, connected to the output side of the Raman amplifier.

In the optical fiber transmission system configured as above, the optical signals (signal wavelengths $\lambda_1$ to $\lambda_N$) input from the respective transmitting sections 11 to 15 are multiplexed by the multiplexing section 21. The multiplexed optical signals are amplified by the optical amplifier 22 and then propagated through the optical fiber transmission path 23. During the propagation, transmission loss occurs and the outputs of individual channels lower over a certain period of time after the signals enter the optical fiber transmission path 23. Then, the optical signals approach the optical amplifier 24, and as the signals pass through the range of influence of Raman amplification, the outputs of the individual channels are increased.

After passing through the optical amplifier 24, the optical signals propagate through the optical fiber transmission path 25 while undergoing similar transmission loss and Raman amplification gain, and then reach the node 27 via the optical amplifier 26.

The node 27 drops signals (signal wavelengths $\lambda_a$, $\lambda_c$) of desired channels or adds signals (signal wavelengths $\lambda_d$, $\lambda_e$) of different channels. Subsequently, the optical signals are input to the optical fiber transmission path 28 from the node 27 to propagate through the transmission path 28 while undergoing transmission loss and Raman amplification gain. The optical signals are then input, via the optical amplifier 29, to the demultiplexing section 30 where the optical signals are demultiplexed into separate signals of the respective channels, which are input to the receiving sections 41 to 45 associated with the respective channels.

Figure 4:
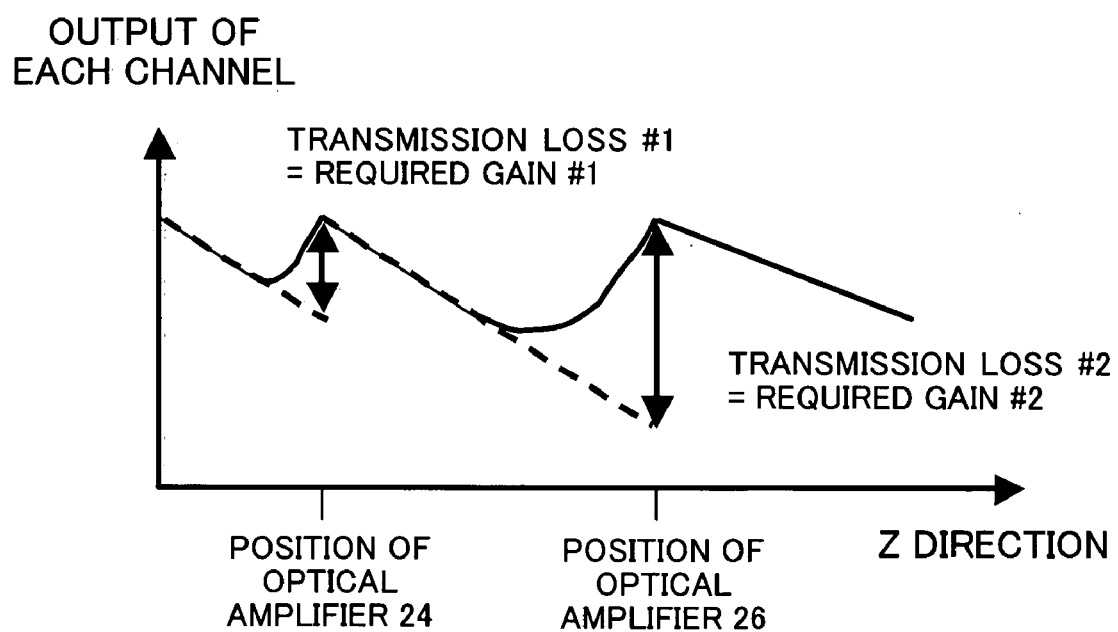
FIG. 4 is a diagram illustrating the relationship between transmission loss and required gain.

FIG. 4 illustrates the relationship between transmission loss and required gain, wherein the horizontal axis indicates the Z direction and the vertical axis indicates the output of each channel at different positions along the Z direction.

The propagating optical signals are subject to transmission loss corresponding to the propagation distance, and as the optical signals approach each of the optical amplifiers, the signals are amplified with a Raman amplification gain.

At this time, it is necessary that the levels of outputs of the individual channels from each optical amplifier should be maintained constant. For example, the output of the pump light needs to be controlled so that a transmission loss #1 caused during the propagation through the optical fiber transmission path 23 may be equal to a required gain #1 by which the signals are amplified before reaching the optical amplifier 24. Similarly, the output of the pump light needs to be controlled so that a transmission loss #2 caused during the propagation through the optical fiber transmission path 25 may be equal to a required gain #2 by which the signals are amplified before reaching the optical amplifier 26.

Also, in the configuration shown in FIG. 3, even if optical channels are added or dropped in the node 27 and thus the number of wavelengths changes, the gain of each optical amplifier needs to be maintained constant. Further, even in the event the transmission loss or the like changes, the gain of the optical amplifier needs to be varied so as to maintain constant output levels.

Generally, the output levels are controlled in terms of total optical output (=channel output×number of wavelengths). Thus, where the number of wavelengths remains the same, constant output levels can be obtained by controlling the total output to a constant value. However, in the case where the number of channels is increased or decreased by the node 27 or the number of wavelengths has changed due to disconnection etc., additional control is required to keep the gain constant.

The following explains how the gain changes depending on the power of the external control light.

Figure 5:
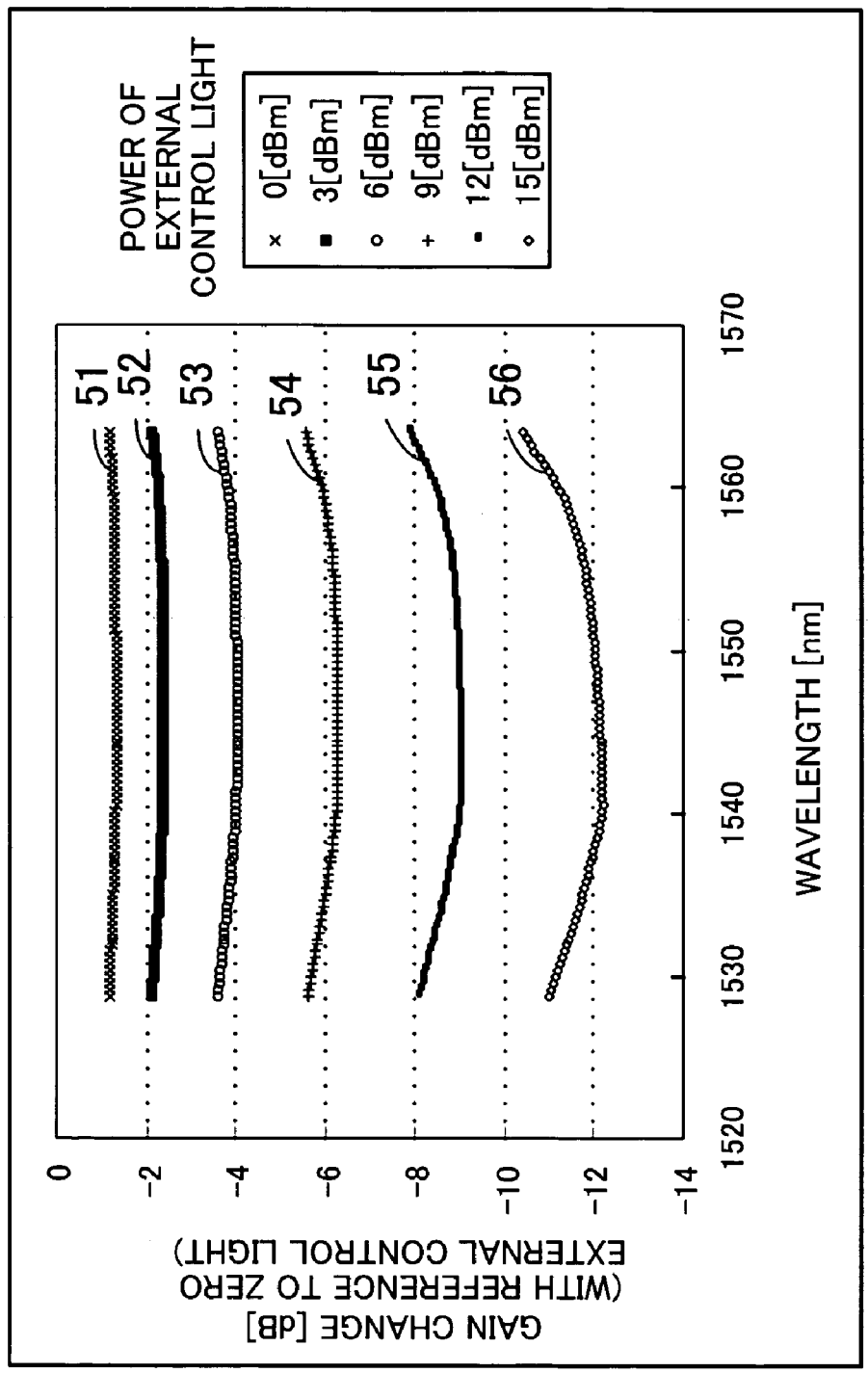
FIG. 5 is a diagram showing Raman gain-wavelength characteristics of a single-mode optical fiber (SMF) observed when the power of external control light is varied.

FIG. 5 shows Raman gain-wavelength characteristics of a single-mode optical fiber (SMF) observed when the power of the external control light is varied, wherein the horizontal axis indicates wavelength (nm) and the vertical axis indicates gain change (dB). The external control light used had a wavelength of 1565 nm.

The illustrated example shows a gain change 51 observed when the external control light power was 0 [dBm], a gain change 52 observed when the external control light power was 3 [dBm], a gain change 53 observed when the external control light power was 6 [dBm], a gain change 54 observed when the external control light power was 9 [dBm], a gain change 55 observed when the external control light power was 12 [dBm], and a gain change 56 observed when the external control light power was 15 [dBm].

Thus, by increasing the output of the external control light, it is possible to change the gain while maintaining the gain profile to a certain degree. Namely, the gain decreases as the power of the external control light is increased. In the case of a distributed Raman amplifier, the input level information cannot be instantly acquired since an optical fiber is used as an amplification medium.

Figure 6:
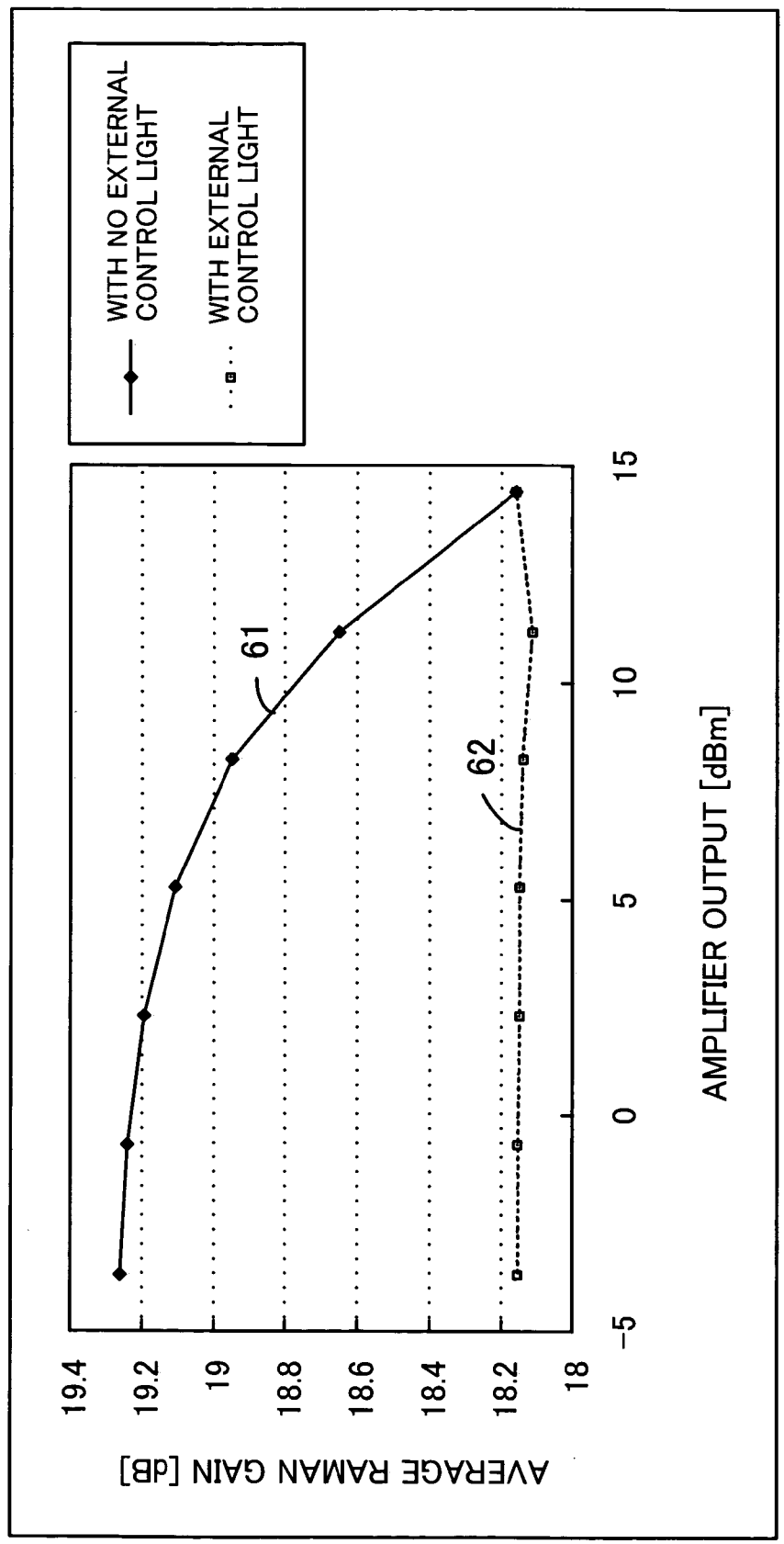
FIG. 6 is a diagram showing changes in average Raman gain with respect to amplifier output.

FIG. 6 shows changes in average Raman gain with respect to the amplifier output. The illustrated example shows how the average Raman gain changes with respect to the amplifier output in the case where the external control light is used, in comparison with the case where no external control light is used. Also, the example shows the case where the amplifier output varies due to change in the number of wavelengths while the amount of pump light is kept constant. In FIG. 6, the horizontal axis indicates the amplifier output [dBm] and the vertical axis indicates the average Raman gain.

Where no external control light is used, an average Raman gain 61 varies depending on the amplifier output. On the other hand, where the external control light is used, an average Raman gain 62 can be made nearly constant regardless of change in the amplifier output.

The illustrated example reveals that, if the external control light is not input, the gain of the Raman amplifier greatly changes when the amplifier output varies due to change in the number of wavelengths (number of channels) while the amount of pump light is kept constant. Namely, the signal beam level varies when the number of wavelengths has changed. However, the gain saturation value, which is reached as the number of wavelengths is increased, is uniquely determined by the signal beam output if the pump light remains constant.

On the other hand, where the external control light is input, the gain saturated state is maintained and the gain of the Raman amplifier does not vary much even if the number of wavelengths changes. Thus, the amount of external control light and the gain control amount are in a constant relationship, and therefore, the gain can be controlled at high speed only by monitoring the output and using the external control light.

Figure 7:
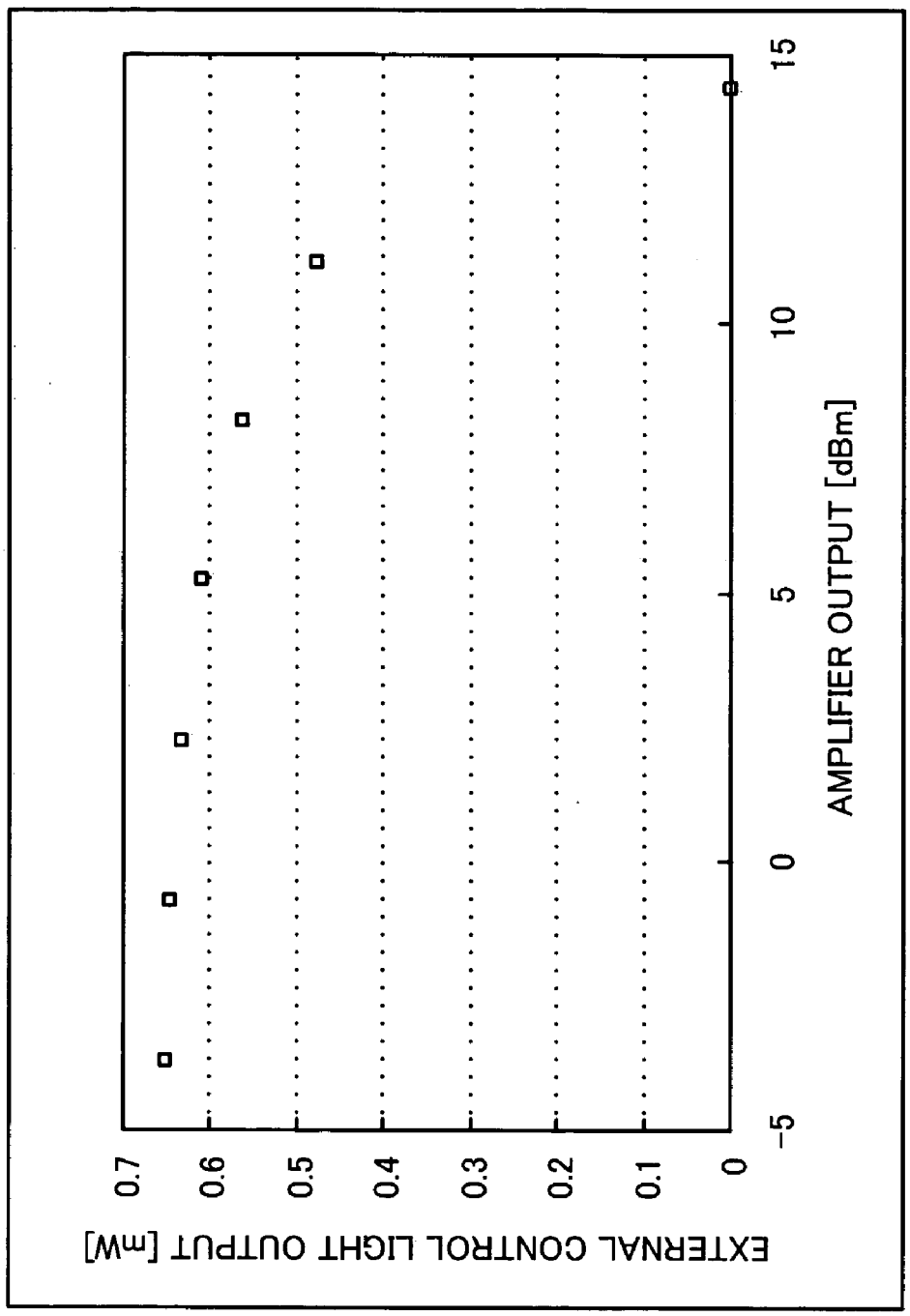
FIG. 7 is a diagram illustrating the relationship between amplifier output and external control light used to vary the gain thereof.

FIG. 7 illustrates the relationship between amplifier output and external control light used to vary the gain thereof. In FIG. 7, the horizontal axis indicates the amplifier output [dBm] and the vertical axis indicates the external control light output [mW].

Figure 8:
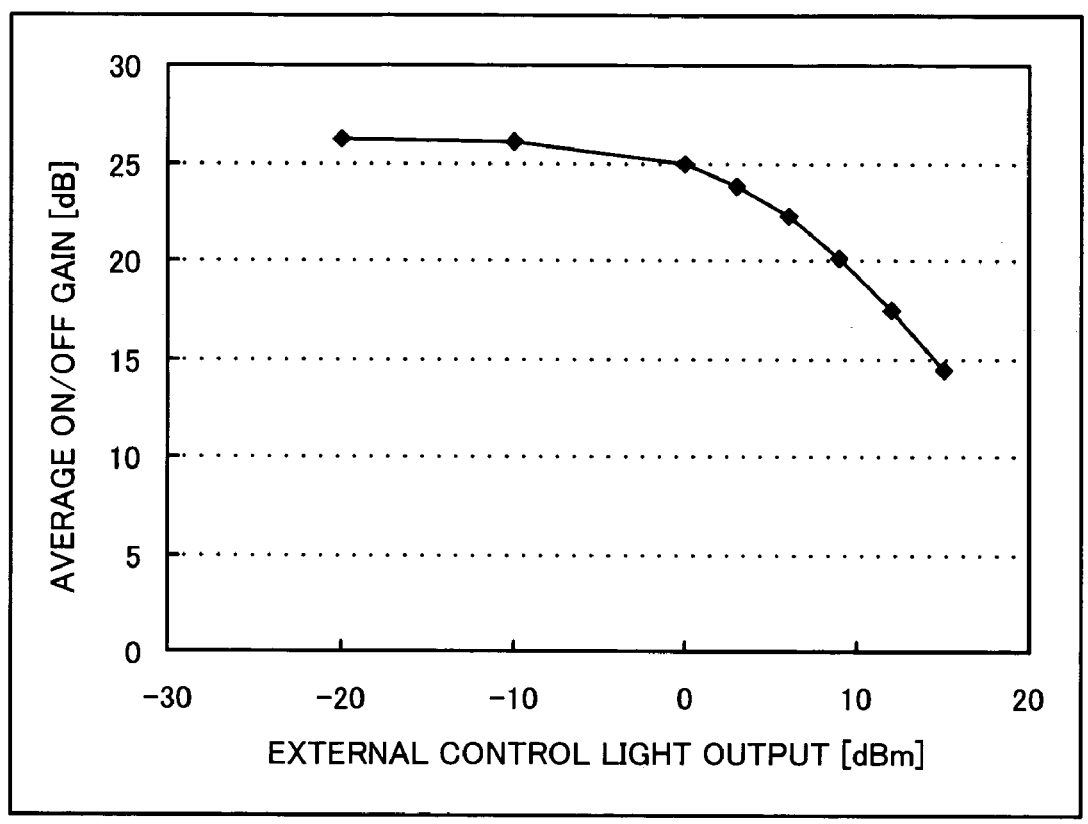
FIG. 8 is a diagram showing change in average ON/OFF gain with respect to the external control light.

FIG. 8 shows change in average ON/OFF gain with respect to the external control light, where the average ON/OFF gain represents the "output during pump light ON state−output during pump light OFF state", and in the illustrated example, the wavelength of the external control light was 1565 nm. In FIG. 8, the horizontal axis indicates the external control light output [dBm] and the vertical axis indicates the average ON/OFF gain. As seen from the figure, as the external control light output increases, the average ON/OFF gain lowers, namely, the signal beam amplification effect induced by the Raman effect lowers.

Figure 9:
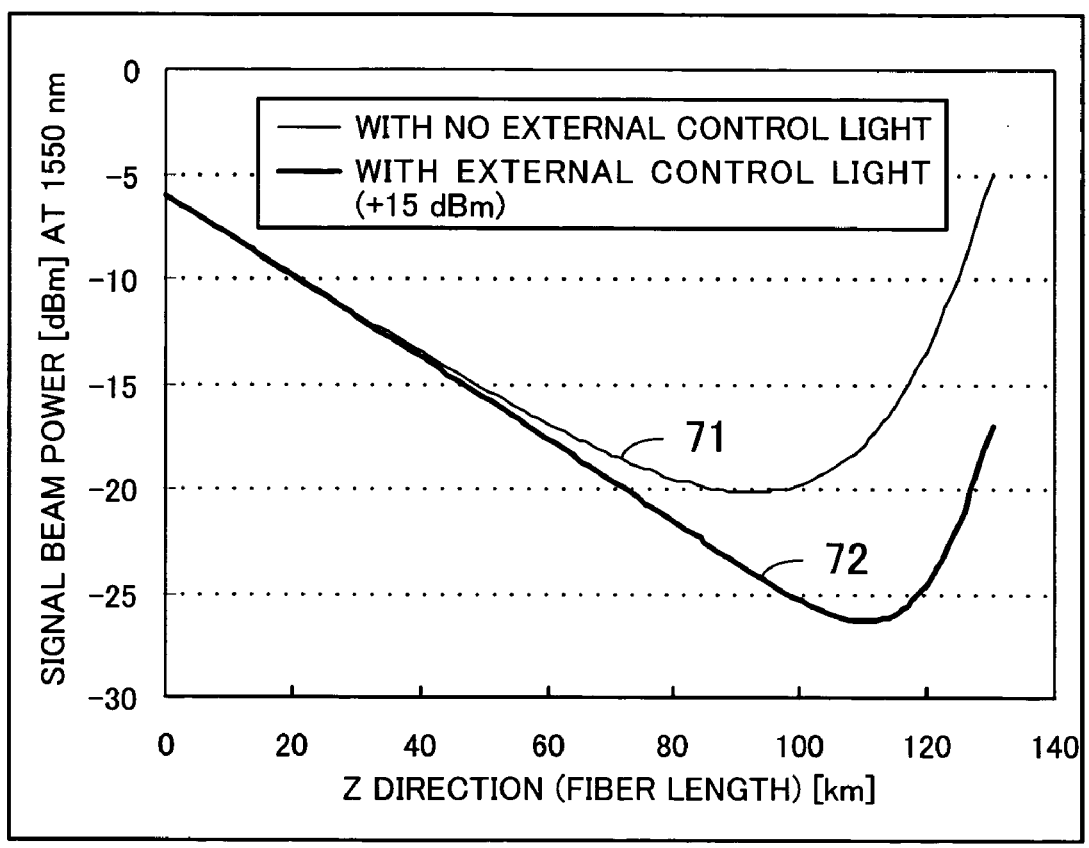
FIG. 9 is a diagram showing examples of amplifier output change along a Z direction.

FIG. 9 shows examples of amplifier output change along the Z direction, wherein the horizontal axis indicates fiber length [km] in the Z direction and the vertical axis indicates signal beam power [dBm]. As shown in FIG. 9, signal beam power 71 obtained when no external control light is used shows a higher value than signal beam power 72 obtained when external control light (+15 dBm) is used. This reveals that the external control light has the effect of indirectly lowering the signal beam power (amplification gain).

Figure 10:
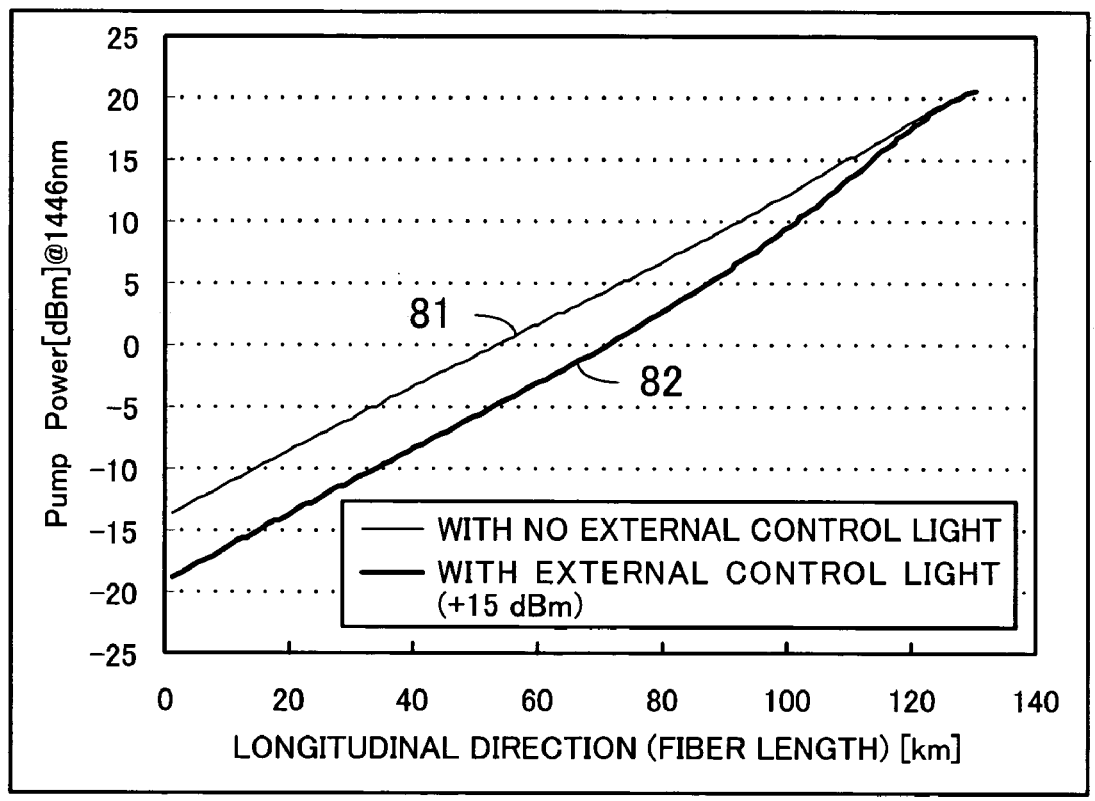
FIG. 10 is a diagram showing examples of pump output change along the Z direction.

FIG. 10 shows examples of pump output change along the Z direction, wherein the horizontal axis indicates fiber length [km] in the Z direction (longitudinal direction) and the vertical axis indicates pump output (Pump Power) [dB]. The pump light used had a wavelength of 1446 nm.

As shown in FIG. 10, the pump output incident on an optical fiber transmission path from a terminating end (130 km) thereof decreases as it propagates through the fiber (130 km→0 km). As illustrated, a pump output 81 observed in the case where no external control light is used shows a higher value than a pump output 82 observed in the case where external control light (+15 dBm) is used, irrespective of the distance of propagation.

Figure 11:
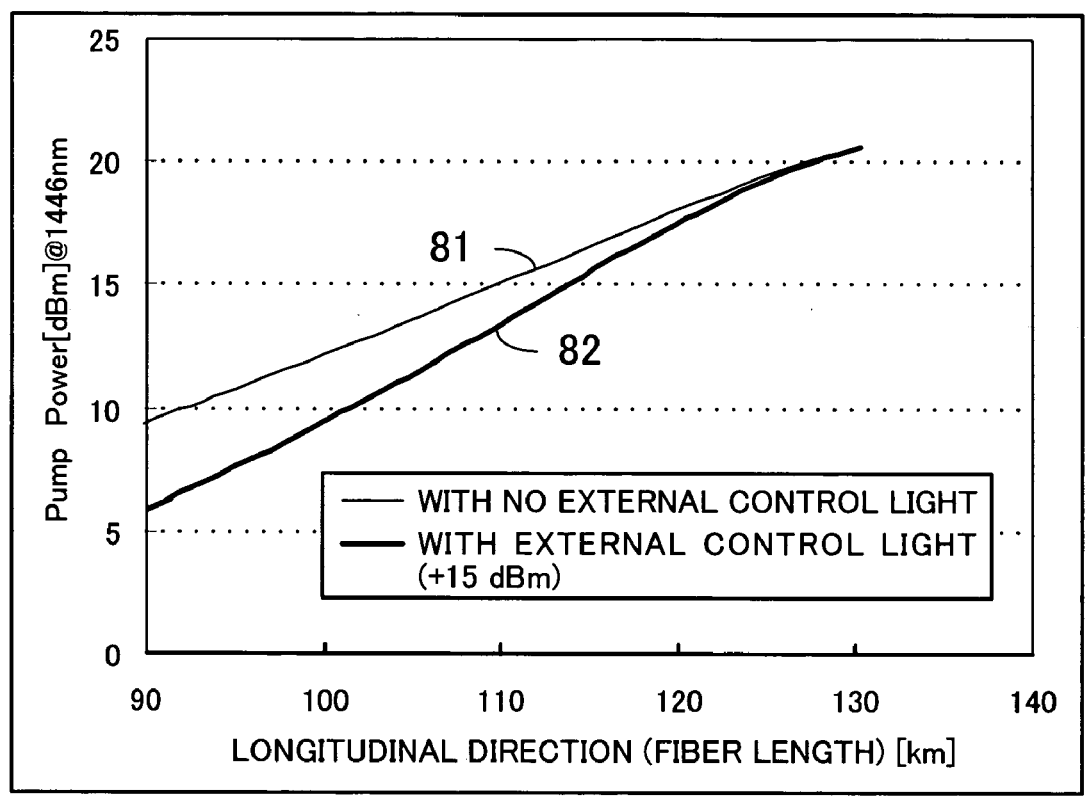
FIG. 11 is a diagram showing, in enlargement, part of FIG. 10.

FIG. 11 shows part of FIG. 10 in enlargement, wherein the horizontal axis indicates the fiber length [km] in the Z direction (longitudinal direction) and the vertical axis indicates the pump output (Pump Power) [dBm], as in FIG. 10. FIG. 11 shows only a fiber length range of from 90 km to 130 km in the Z direction.

As shown in FIG. 11, the use/nonuse of the external control light has no influence on the pump output within a certain range from the terminating end of the optical fiber transmission path. However, if the pump output is propagated over a certain distance or more from the terminating end, the output suddenly decreases under the influence of the external control light.

suitable output of the external control light source is determined taking account of the aforementioned characteristics. The following describes a computation process related to the external control light.

Figure 12:
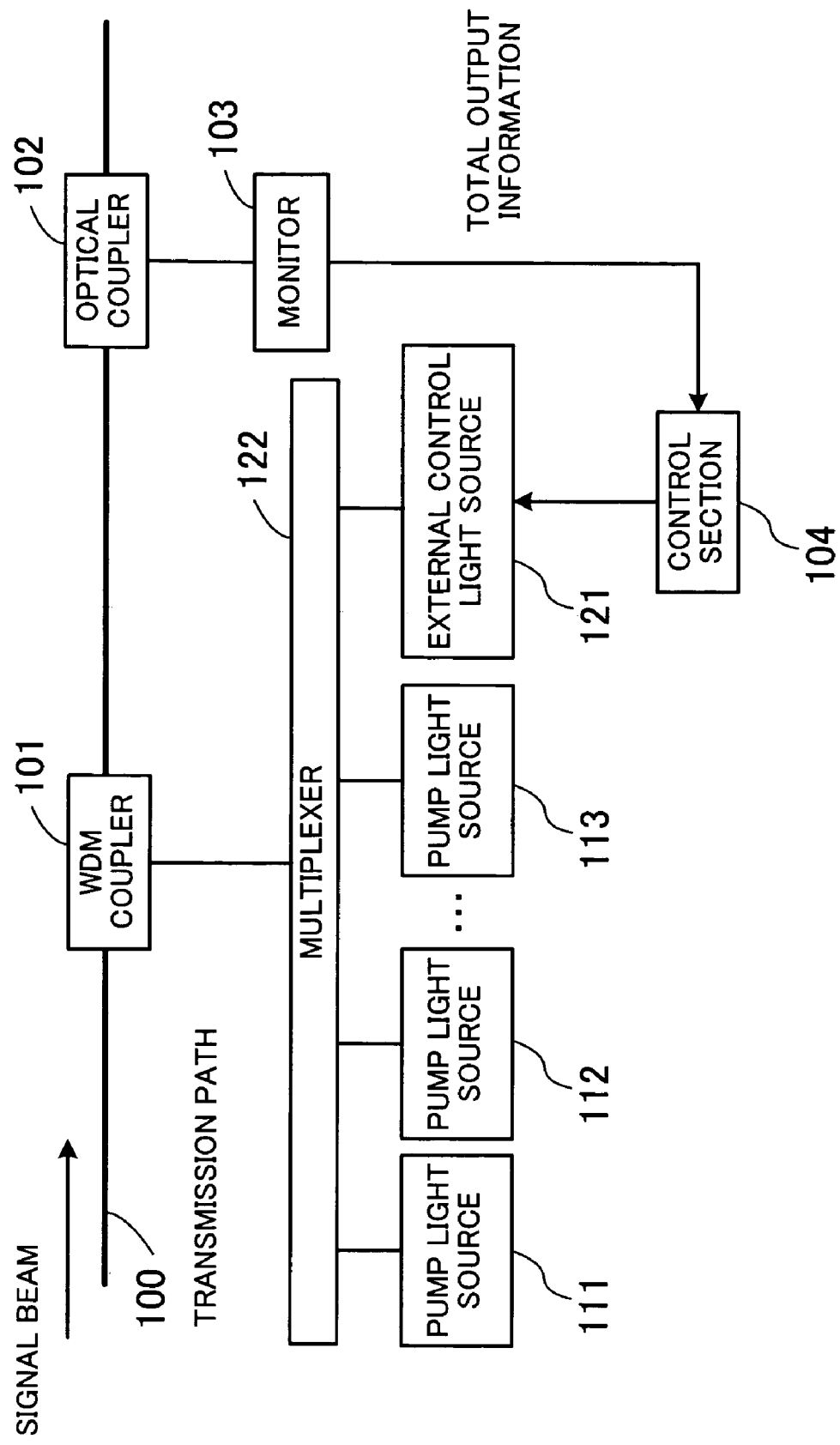
FIG. 12 is a functional block diagram of a Raman amplifier for controlling the output of the external control light.

FIG. 12 is a functional block diagram of a Raman amplifier in which the output of the external control light is controlled.

A WDM coupler 101 and an optical coupler 102 are arranged on a transmission path 100. The WDM coupler 101 receives light from a multiplexer 122 and emits the received light to the transmission path 100 in a direction opposite to that of a signal beam. The optical coupler 102 is connected to a monitor 103 and supplies the monitor 103 with part of the signal beam propagated through the transmission path 100.

The monitor 103 is electrically connected to a control section 104. The monitor 103 detects the total output of the signal beam and converts the total output information to an electrical signal, which is supplied to the control section 104. The control section 104 determines the output power for an external control light source on the basis of the signal beam total output information. The control section 104 is connected to an external control light source 121 and supplies the light source 121 with control information indicative of the determined output power.

The external control light source 121 is connected to the multiplexer 122 and outputs external control beams of preselected wavelengths to the multiplexer 122 with the power determined by the control section 104.

The multiplexer 122 is also connected with a plurality of pump light sources 111, 112, 113. The pump light sources 111, 112, 113 output, to the multiplexer 122, pump beams for amplifying respective channels of the signal beam by means of the Raman effect. The multiplexer 122, which is connected to the WDM coupler 101, multiplexes the beams (pump beams and external control beams) output from the pump light sources 111, 112, 113 and the external control light source 121, and emits the multiplexed light to the WDM coupler 101.

With the Raman amplifier configured in this manner, the signal beam total output information is detected by the monitor 103 and supplied to the control section 104. The control section 104 computes the output power of the external control light on the basis of the total output information, and controls the external control light source 121 accordingly. In consequence, the external control light with the specified power is multiplexed with the pump light, and the multiplexed light is emitted to the transmission path 100 in the opposite direction.

Where the gain is thus controlled by means of the external control light, the wavelengths of the external control light are selected in advance, whereby the output of the external control light can be controlled by monitoring the total output information and controlling the power of the external control light in a simplified manner.

The following describes examples of tilt changes observed when the signal beam output is controlled by pump ratio adjustment control, constant pump control, and output control of the external control light.

FIG. 13 shows tilt changes observed when the pump ratio adjustment control is performed. Where the pump ratio is adjusted, a tilt change is 0 [dB] when a gain variation is 0 [dB]. The tilt change is 0.15 [dB] for a gain variation of −1.14 [dB], the tilt change is 0.26 [dB] for a gain variation of −2.33 [dB], the tilt change is 0.36 [dB] for a gain variation of −3.55 [dB], the tilt change is 0.61 [dB] for a gain variation of −6.07 [dB], the tilt change is 0.87 [dB] for a gain variation of −8.64 [dB], the tilt change is 1.15 [dB] for a gain variation of −11.22 [dB], the tilt change is 1.40 [dB] for a gain variation of −13.79 [dB], the tilt change is 1.63 [dB] for a gain variation of −16.34 [dB], and the tilt change is 1.82 [dB] for a gain variation of −18.86 [dB].

FIG. 14 shows tilt changes observed when the constant pump control is performed. Where the constant pump control is performed, the tilt change is 0 [dB] when the gain variation is 0 [dB]. The tilt change is 0.33 [dB] for a gain variation of −1.11 [dB], the tilt change is 0.65 [dB] for a gain variation of −2.27 [dB], the tilt change is 0.97 [dB] for a gain variation of −3.47 [dB], the tilt change is 1.56 [dB] for a gain variation of −5.95 [dB], the tilt change is 2.06 [dB] for a gain variation of −8.50 [dB], the tilt change is 2.44 [dB] for a gain variation of −11.07 [dB], the tilt change is 2.68 [dB] for a gain variation of −13.66 [dB], the tilt change is 2.76 [dB] for a gain variation of −16.24 [dB], and the tilt change is 2.65 [dB] for a gain variation of −18.80 [dB].

FIG. 15 shows tilt changes observed when the output control of the external control light is performed. Where the output of the external control light is controlled, the tilt change is 0 [dB] when the gain variation is 0 [dB]. The tilt change is 0.00 [dB] for a gain variation of −0.01 [dB], the tilt change is 0.02 [dB] for a gain variation of −0.14 [dB], the tilt change is 0.14 [dB] for a gain variation of −1.27 [dB], the tilt change is 0.26 [dB] for a gain variation of −2.31 [dB], the tilt change is 0.44 [dB] for a gain variation of −3.91 [dB], the tilt change is 0.72 [dB] for a gain variation of −6.08 [dB], the tilt change is 1.14 [dB] for a gain variation of −8.73 [dB], and the tilt change is 1.80 [dB] for a gain variation of −11.75 [dB].

Figure 16:
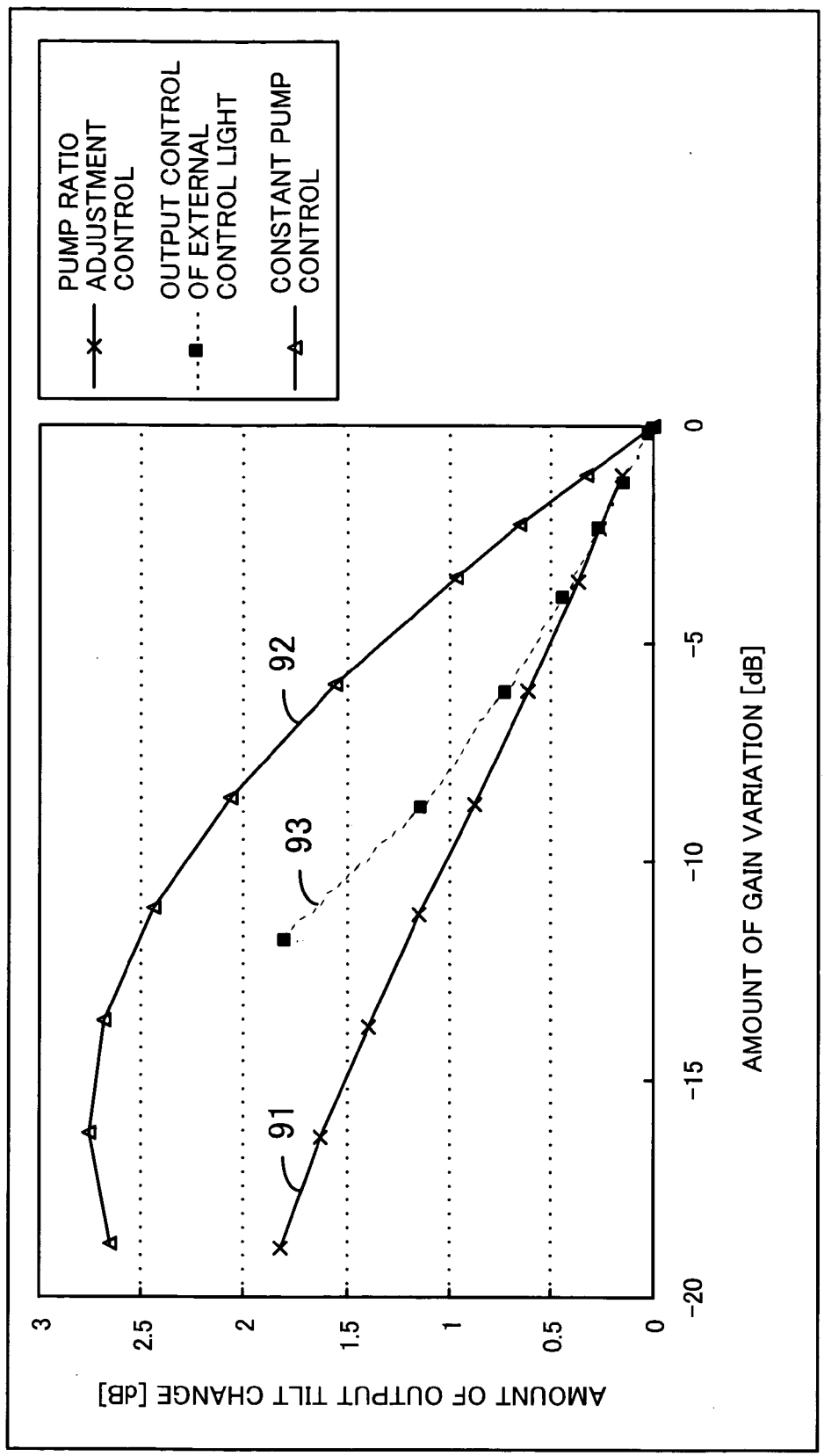
FIG. 16 is a diagram showing output tilt changes with respect to gain variation observed for respective control types.
Figure 17:
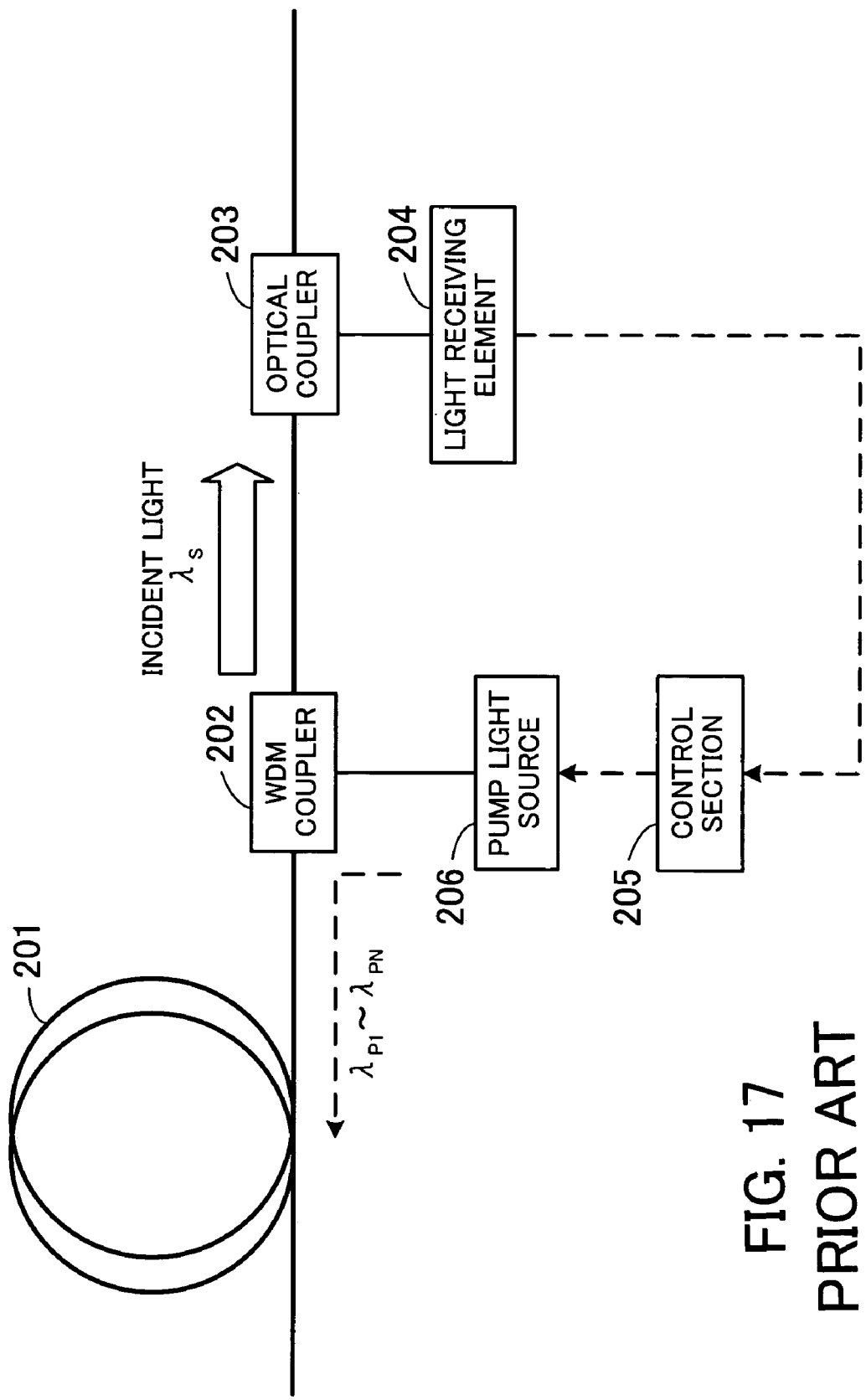
FIG. 17 is a diagram showing an exemplary configuration of a conventional Raman amplifier.
Figure 18:
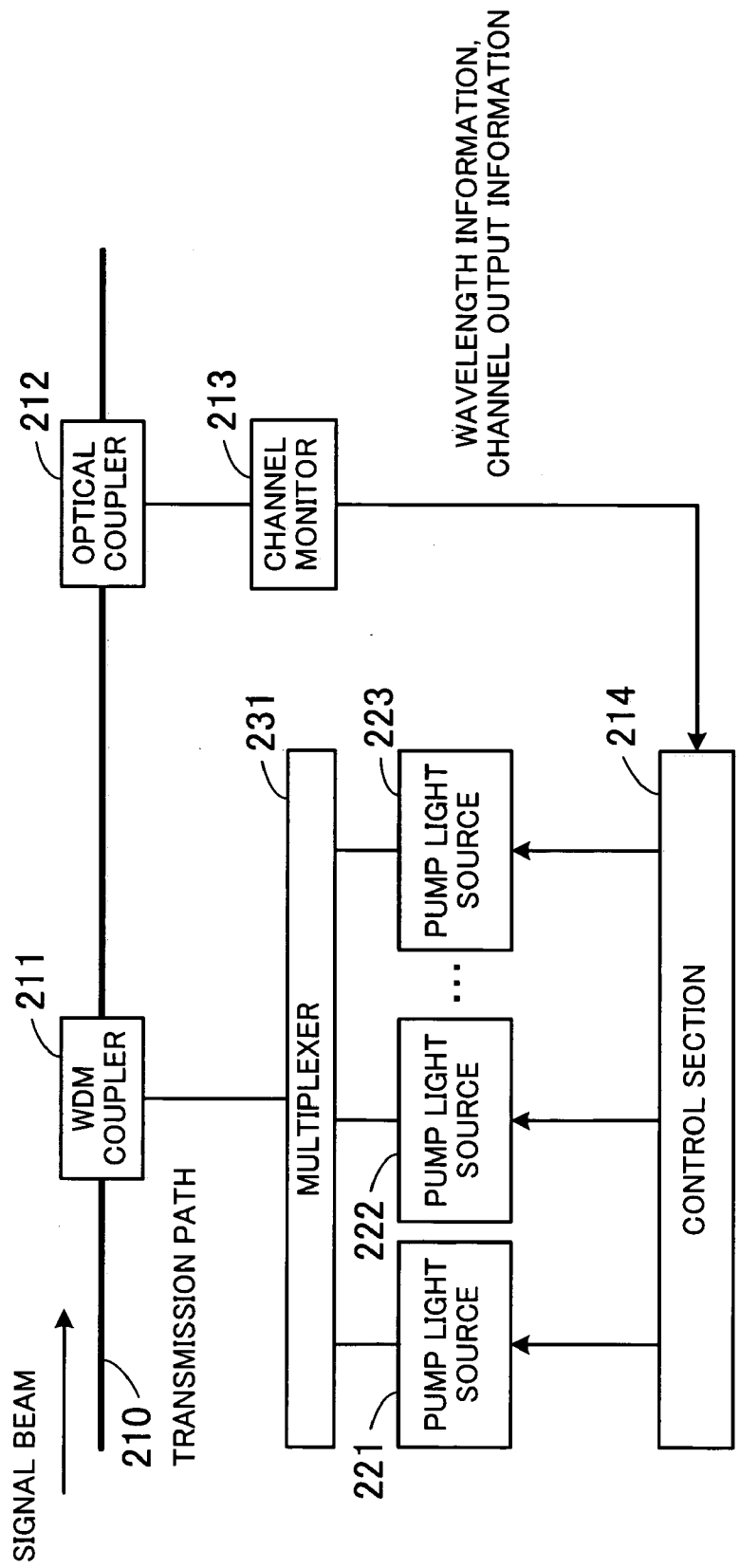
FIG. 18 is a block diagram illustrating a conventional output control method for pump light sources.
Figure 19:
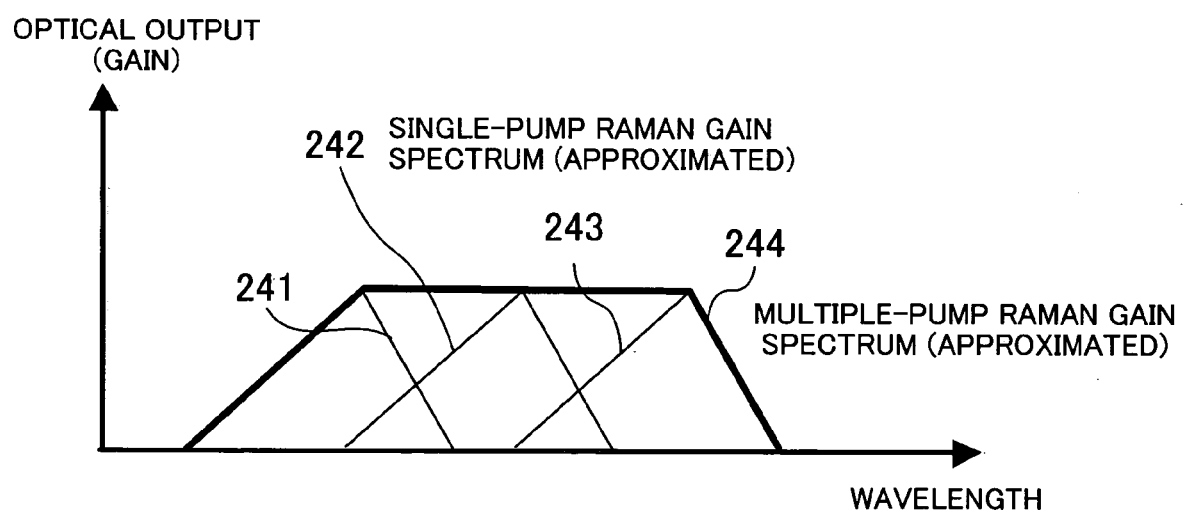
FIG. 19 is a diagram illustrating the wavelength-optical output relationship according to the conventional technique.

FIG. 16 shows output tilt changes with respect to gain variation observed for the respective control types, wherein the horizontal axis indicates the amount of gain variation [dB] and the vertical axis indicates the amount of output tilt change. In the case of the pump ratio adjustment control, an output tilt change 91 shows a nearly straight line. An output tilt change 92 observed in the case of the constant pump control shows very large values, compared with the case of the pump ratio adjustment control. In the case of the output control of the external control light, an output tilt change 93 shows a characteristic similar to that observed in the case of the pump ratio adjustment control when the amount of gain variation is close to 0. As the amount of gain variation changes away from 0, however, the output tilt change 93 gradually shows large values, compared with the case of the pump ratio adjustment control.

As explained above, the use of the external control light source permits easy and high-speed control of the gain of the optical amplifier. Namely, the gain to be induced by the Raman effect can be controlled by means of the external control beams smaller in number than the wavelengths of pump light, thus facilitating the control of light amplification.

According to the present invention, the gain with which the signal beam is to be amplified by a plurality of pump light sources is controlled by the external control light as described above, and accordingly, the light amplification can be controlled by a simple method so as to obtain a desired gain, compared with the case of directly controlling the outputs of the multiple pump light sources.

The foregoing is considered as illustrative only of the principles of the present invention. Further, since numerous modifications and changes will readily occur to those skilled in the art, it is not desired to limit the invention to the exact construction and applications shown and described, and accordingly, all suitable modifications and equivalents may be regarded as falling within the scope of the invention in the appended claims and their equivalents.

What is claimed is:

1. A light amplification control unit for controlling amplification of signal lights propagating through an optical fiber, comprising:
    a plurality of pump light sources, each for generating a pump light causing a Raman amplification effect on at least one of the signal lights;
    an external control light source for generating an external control light having a wavelength that is longer than wavelengths of the pump lights and influences the Raman amplification effect exerted on the signal lights by the pump lights;
    a multiplexing section for multiplexing the pump with the external control light and causing the multiplexed lights to enter the optical fiber in a direction opposite to that of the signal lights; and
    a control section for controlling the output of the external control light from the external control light source.

2. The light amplification control unit according to claim 1, wherein the external control light, when increased, reduces the Raman amplification effect on the signal lights.

3. The light amplification control unit according to claim 1, wherein the wavelength of the external control light falls within a wavelength band of the signal lights.

4. The light amplification control unit according to claim 1, wherein the external control light source generates the external control light with a wavelength falling within a range wider than the wavelength band of the signal lights by +30 nm and −30 nm.

5. The light amplification control unit according to claim 1, comprising a plurality of the external control light sources.

6. The light amplification control unit according to claim 5, wherein all of the external control light sources generate external control lights with wavelengths falling within a range wider than a wavelength band of the signal lights by +30 nm and −30 nm, and part of the external control light sources generate external control lights with wavelengths falling within the wavelength band of the signal lights.

7. The light amplification control unit according to claim 1, further comprising a light receiving element for detecting power of the signal lights, and
    wherein the control section computes suitable power of the external control light on the basis of the power detected by the light receiving element, and controls the output of the external control light from the external control light source in accordance with the computation result.

8. The light amplification control unit according to claim 1, wherein the wavelength of the external control light falls within a wavelength range on which the pump light with the longest wavelength exerts a Raman amplification effect.

* * * * *

UNITED STATES PATENT AND TRADEMARK OFFICE
CERTIFICATE OF CORRECTION

PATENT NO. : 7,133,192 B2  
APPLICATION NO. : 10/792746  
DATED : November 7, 2006  
INVENTOR(S) : Tomoto Tanaka et al.

Page 1 of 1

It is certified that error appears in the above-identified patent and that said Letters Patent is hereby corrected as shown below:

Column 11, line 18, after "pump" insert --lights--.

Signed and Sealed this

Sixth Day of March, 2007

JON W. DUDAS  
*Director of the United States Patent and Trademark Office*